US012620084B2

(12) United States Patent
Muraishi

(10) Patent No.: US 12,620,084 B2
(45) Date of Patent: May 5, 2026

(54) INSPECTION APPARATUS AND METHOD FOR CONTROLLING INSPECTION APPARATUS FOR INSPECTING A PRINTED MATERIAL

(71) Applicant: CANON KABUSHIKI KAISHA, Tokyo (JP)

(72) Inventor: Masaaki Muraishi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 18/316,925

(22) Filed: May 12, 2023

(65) Prior Publication Data

US 2023/0377130 A1     Nov. 23, 2023

(30) Foreign Application Priority Data

May 19, 2022    (JP) ................................. 2022-082097

(51) Int. Cl.
*G06T 7/00*               (2017.01)
(52) U.S. Cl.
CPC .... *G06T 7/001* (2013.01); *G06T 2207/30144* (2013.01)
(58) Field of Classification Search
None
See application file for complete search history.

(56) References Cited

U.S. PATENT DOCUMENTS

2007/0291286 A1* 12/2007 Utsunomiya ...... H04N 1/00015
                                                             358/1.8
2011/0149331 A1    6/2011 Duggan et al.

| | | | | |
|---|---|---|---|---|
| 2013/0250370 A1* | 9/2013 | Kojima | .............. | H04N 1/00047 |
| | | | | 358/405 |
| 2014/0192382 A1* | 7/2014 | Yamanouchi | .............. | B41J 3/60 |
| | | | | 358/1.18 |
| 2018/0299389 A1* | 10/2018 | Kaneko | .................. | G01N 23/18 |
| 2020/0234421 A1 | 7/2020 | Kaminaka | | |
| 2021/0172884 A1* | 6/2021 | Nuriya | ...................... | G06T 7/12 |
| 2021/0397386 A1 | 12/2021 | Hayashi | | |
| 2021/0405936 A1* | 12/2021 | Kawamura | ............. | G06F 3/121 |
| 2022/0276812 A1* | 9/2022 | Kashiwagi | ........... | G06F 3/1253 |
| 2023/0062675 A1* | 3/2023 | Kazumi | .................. | G06T 7/001 |

FOREIGN PATENT DOCUMENTS

| JP | 2013132042 A | | 7/2013 |
|---|---|---|---|
| JP | 2021053819 A | * | 4/2021 |
| JP | 2021078083 A | | 5/2021 |
| JP | 2021196310 A | | 12/2021 |

* cited by examiner

*Primary Examiner* — Henok Shiferaw
(74) *Attorney, Agent, or Firm* — Canon U.S.A., Inc. IP Division

(57)               ABSTRACT

An inspection apparatus configured to be communicably connected to an image forming apparatus for printing an image on a sheet, includes a controller for receiving at least a reference image and print setting information, registering the reference image based on the print setting information, receiving a scanned image generated by reading a printed material on which an image is printed on the sheet, and inspecting the printed material based on the scanned image and the reference image corresponding to the scanned image. The controller is arranged to perform the inspection using reference data when the scanned image includes a blank page for which a corresponding reference image is not registered.

14 Claims, 12 Drawing Sheets

| IMAGE FILE | 1 | 2 | 3 | 4 | 5 |
|---|---|---|---|---|---|
| FILE NAME | RefImage_1.tif | RefImage_2.tif | RefImage_3.tif | RefImage_4.tif | RefImage_5.tif |

| | 601 | 602 | 603 | 604 | 605 | 606 |
|---|---|---|---|---|---|---|
| SHEET NUMBER | 1 | 1 | 2 | 2 | 3 | 3 |
| READING SIDE | FRONT | BACK | FRONT | BACK | FRONT | BACK |
| PAGE ID | 1 | 2 | 3 | 4 | 5 | BLANK |

FIG.11A

| SHEET NUMBER | 1 | 1 | 2 | 2 | 3 | 3 | 4 | 4 | 5 | 5 |
|---|---|---|---|---|---|---|---|---|---|---|
| READING SIDE | FRONT | BACK | FRONT | BACK | FRONT | BACK | FRONT | BACK | FRONT | BACK |
| PAGE ID | 1 | BLANK | 2 | BLANK | 3 | BLANK | 4 | BLANK | 5 | BLANK |

FIG.11B

| SHEET NUMBER | 1 | 1 | 2 | 2 | 3 | 3 | 4 | 4 | 5 | 5 |
|---|---|---|---|---|---|---|---|---|---|---|
| READING SIDE | FRONT | BACK | FRONT | BACK | FRONT | BACK | FRONT | BACK | FRONT | BACK |
| PAGE ID | 1 | SKIP | 2 | SKIP | 3 | SKIP | 4 | SKIP | 5 | SKIP |

INSPECTION APPARATUS AND METHOD FOR CONTROLLING INSPECTION APPARATUS FOR INSPECTING A PRINTED MATERIAL

BACKGROUND OF THE INVENTION

Field of the Invention

The present invention relates to an inspection apparatus and method for controlling inspection apparatus.

Description of the Related Art

Inspection to check whether a printed material is correctly printed has conventionally been manually performed. In recent years, an apparatus that automatically performs the inspection as post-processing of a printer has been used. Such an inspection apparatus first registers reference image data. Processing for the registration is called a reference image registration job. Subsequently, a user makes inspection settings to set a region where a defect is to be detected in a regular print job and a threshold with respect to a reference image. Next, the regular print job is executed, an image forming apparatus prints and outputs input image data on a sheet, and an inspection sensor inside the inspection apparatus reads a printed material printed and output on the sheet. Image data read by the inspection sensor and the reference image data first registered are compared to detect a defect of the printed material. Inspection to detect a defect in a picture pattern part of the printed material is called printed image inspection.

In the reference image registration job, a raster image processor (RIP) image that is obtained by rasterizing print data is registered as the reference image. Japanese Patent Application Laid-Open No. 2021-196310 discusses a method of acquiring information indicating a reference image from an information processing apparatus and performing inspection by comparing a printed material printed by a printing apparatus with a scanned image.

SUMMARY OF THE INVENTION

According to an aspect of the present invention, an inspection apparatus configured to be communicably connected to an image forming apparatus for printing an image on a sheet, the inspection apparatus comprising a controller for receiving at least a reference image and print setting information, registering the reference image based on the print setting information, receiving a scanned image generated by reading a printed material on which an image is printed on the sheet; and inspecting the printed material based on the scanned image and the reference image corresponding to the scanned image. The controller is arranged to perform the inspection using reference data when the scanned image comprises a blank page for which a corresponding reference image is not registered.

Further features of the present invention will become apparent from the following description of exemplary embodiments with reference to the attached drawings.

BRIEF DESCRIPTION OF THE DRAWINGS

FIGS. 11A and 11B each illustrate an example of a sheet information list according to the second embodiment.

DESCRIPTION OF THE EMBODIMENTS

Some embodiments of the present invention are described in detail with reference to accompanying drawings. The following embodiments do not limit the invention according to the claims, and all of combinations of features described in the embodiments are not necessarily essential for solving means of the present invention.

In the following description, an image forming apparatus is also referred to as a multifunctional peripheral (MFP) in some cases.

Figure 1:
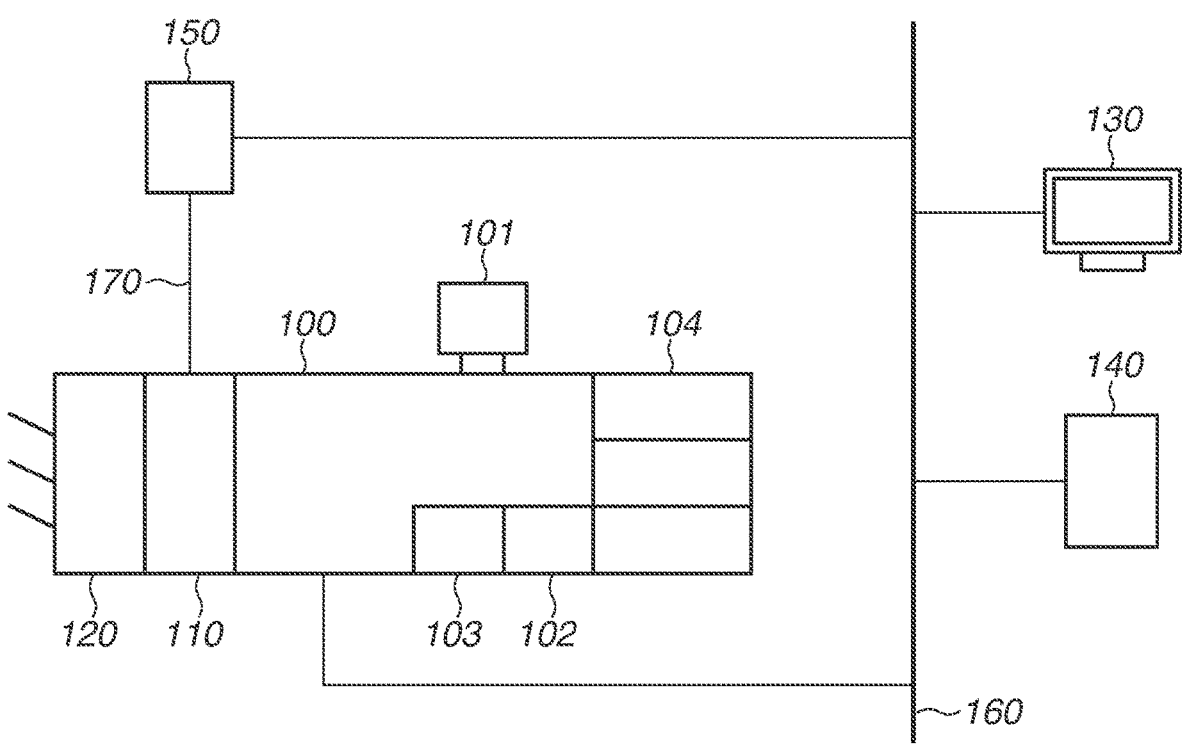
FIG. 1 is a diagram illustrating an example configuration of a system including an inspection apparatus according to a first embodiment.

A first embodiment of the present invention will be described below. FIG. 1 is a diagram illustrating a configuration of an inspection system including an inspection apparatus according to an embodiment of the present invention. FIG. 1 includes an image forming apparatus 100, an inspection unit 110, a finisher 120, a client personal computer (PC) 130, an information processing apparatus 140, an inspection apparatus 150, a network 160, and a communication cable 170.

The image forming apparatus 100 includes a user interface (UI) unit 101, a sheet feeding deck 102, and a sheet feeding deck 103. Further, an optional deck 104 including three stages of sheet feeding decks is connected to the image forming apparatus 100. A recording sheet, such as print paper, is settable in each of the decks. The image forming apparatus 100 performs print output based on various types of input data, for example, print data transmitted from the client PC 130 or the information processing apparatus 140. The image forming apparatus 100 includes the inspection unit 110 and the finisher 120, and is connected to the inspection unit 110 and the finisher 120 through a communication cable as an internal bus.

The inspection unit 110 receives a printed material output from the image forming apparatus 100, and acquires image data for inspection as to whether an abnormal image is present on the received printed material. Here, the abnormal image means one that decreases the quality of the printed material. Examples of the abnormal image include a circular abnormal image (spot) resulting from adhesion of a color material to an unintended position in printing, a color omission resulting from insufficient adhesion of a color material to an intended position, and an abnormal linear image (stripe). The acquired image data is transferred to the inspection apparatus 150 described below through the communication cable 170, the inspection apparatus 150 inspects whether the abnormal image is present in the printed material, and the inspection unit 110 acquires an inspection result from the inspection apparatus 150.

The finisher 120 receives an output sheet inspected by the inspection unit 110, switches a sheet discharge destination based on the inspection result of the inspection unit 110, and/or performs post-processing (e.g., bookbinding) as appropriate.

The image forming apparatus 100 is communicably connected to the client PC 130, the information processing apparatus 140, and the inspection apparatus 150 through the network 160. In the present embodiment, the inspection is performed by the inspection apparatus 150. The configuration is not limited to the present embodiment, and a configuration of an in-line inspection machine that consistently performs image formation, inspection, post-processing, and discharge may be adopted.

A print job is generated by the client PC 130, is transmitted to the information processing apparatus 140 via the network 160, and is managed by the information processing apparatus 140. The print job is transmitted from the information processing apparatus 140 to the image forming apparatus 100 via the network 160, and the image forming apparatus 100 performs print processing on a sheet. The print job may be generated and managed by the information processing apparatus 140, may be transmitted to the image forming apparatus 100 via the network 160, and may be managed by the image forming apparatus 100.

The client PC 130, the information processing apparatus 140, and the inspection apparatus 150 may be connected to a communication cable to communicate with the image forming apparatus 100. In other words, it goes without saying that a connection form of the image forming apparatus 100, the information processing apparatus 140, and the client PC 130 described in the present embodiment is merely an example, and there are various connection forms in addition to the connection form described in the present embodiment. In addition to the inspection unit 110 and the finisher 120, a large-capacity stacker, a folding machine, a bookbinding machine, and the like may be connected to the image forming apparatus 100.

[Control Block Diagram]

Figure 2:
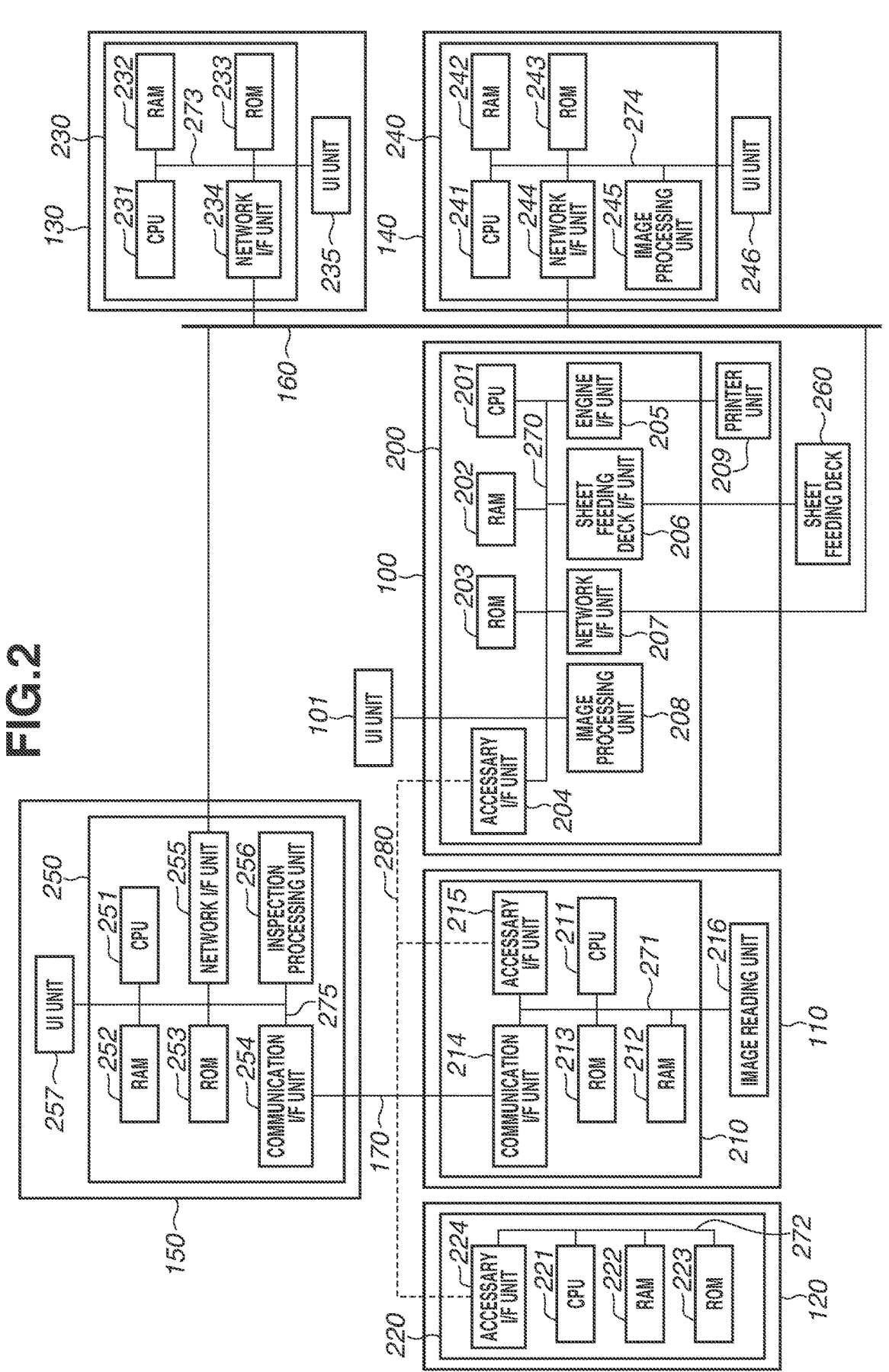
FIG. 2 is a diagram illustrating an example of an internal configuration of the system according to the first embodiment.

FIG. 2 is a block diagram illustrating a control configuration of the image forming apparatus 100, the inspection unit 110, the finisher 120, the client PC 130, the information processing apparatus 140, and the inspection apparatus 150 according to the present embodiment.

The client PC 130 is a PC that generates a print job and transmits the print job to the information processing apparatus 140 via the network 160. The client PC 130 includes a control unit 230 and a UI unit 235. The control unit 230 includes a central processing unit (CPU) 231, a random access memory (RAM) 232, a read only memory (ROM) 233, and a network interface (I/F) unit 234.

The CPU 231 controls the entire client PC 130. The RAM 232 functions as a work area when the CPU 231 performs various instructions. The ROM 233 stores program data to be executed by the CPU 231 at startup, setting data of the control unit 230, and the like. The network I/F unit 234 communicates data with the information processing apparatus 140 via the network 160. The control unit 230 includes an internal bus (system bus) 273. The UI unit 235 includes, for example, a keyboard, a mouse, a display, and other input/output devices, and enables inputs of various setting values or designated values.

The information processing apparatus 140 performs raster image processor (RIP) processing of print data and document data, and generates a bitmap image for printing with the image forming apparatus 100. The information processing apparatus 140 performs control relating to printing with the image forming apparatus 100 and manages the print job. The information processing apparatus 140 includes a control unit 240 and a UI unit 246. The control unit 240 includes a CPU 241, a RAM 242, a ROM 243, a network I/F unit 244, and an image processing unit 245.

The CPU 241 controls the entire information processing apparatus 140. The RAM 242 functions as a work area when the CPU 241 performs various instructions. The ROM 243 stores program data to be executed by the CPU 241 at startup, setting data of the control unit 240, and the like. The network I/F unit 244 communicates data with the client PC 130, the image forming apparatus 100, and the inspection apparatus 150 via the network 160. The control unit 240 includes an internal bus (system bus) 274.

The image processing unit 245 performs the RIP processing for converting the print data and the document data transmitted from the client PC 130, into bitmap image data based on a use application of the RIP processing and print setting. More specifically, in a case of the RIP processing for reference image registration, for example, the image processing unit 245 converts resolution of 600 dpi into 300 dpi to generate an image. In a case of the RIP processing for print data, the image processing unit 245 generates an image of 600 dpi without reducing the resolution. In the RIP processing for the reference image registration, the RIP-processed image data is transferred to the inspection apparatus 150 via the network 160, and is used as an inspection reference image. In the RIP processing for the print data in inspection, the RIP-processed image data is transferred to the image forming apparatus 100 via the network 160, and is subjected to print processing.

The UI unit 246 includes a keyboard, a mouse, a display, and other input/output devices, and enables inputs of various setting values or designated values.

The image forming apparatus 100 performs print output based on various types of input data, for example, print data transmitted from the client PC 130 and/or the information processing apparatus 140.

The image forming apparatus 100 is connected to the UI unit 101 and a sheet feeding deck 260. The image forming apparatus 100 includes a control unit 200 and a printer unit 209. The control unit 200 includes a CPU 201, a RAM 202, a ROM 203, an accessory I/F unit 204, an engine I/F unit 205, a sheet feeding deck I/F unit 206, a network I/F unit 207, and an image processing unit 208. The image forming apparatus 100 is connected to the printer unit 209 via the engine I/F unit 205.

The CPU 201 controls the entire image forming apparatus 100. The RAM 202 functions as a work area when the CPU 201 performs various instructions. The ROM 203 stores program data to be executed by the CPU 201 at startup, setting data of the control unit 200, and the like.

The accessory I/F unit 204 is connected to accessory I/F units 215 and 224 via a cable 280. In other words, the image forming apparatus 100 mutually communicates with the inspection unit 110 and the finisher 120 via the accessory I/F units 204, 215, and 224. The engine I/F unit 205 transmits the print data to the printer unit 209. The sheet feeding deck I/F unit 206 performs communication and control of the sheet feeding deck 260. The sheet feeding deck 260 is a general term as a hardware configuration of the sheet feeding decks 102 and 103 and the optional deck 104. The network I/F unit 207 communicates data with the client PC 130, the image forming apparatus 100, and the inspection apparatus 150 via the network 160. The control unit 200 includes an internal bus (system bus) 270.

The image processing unit 208 performs processing of converting an image and document data received via the network 160 into print data.

The image and the document created by the client PC 130 or the information processing apparatus 140 on the network 160 are transmitted as page-description language (PDL) data to the image forming apparatus 100 via a network (e.g., local area network). The transmitted PDL data is stored in the RAM 202 via the network I/F unit 207. A print instruction provided by the user with the UI unit 101 is also stored in the RAM 202 via the internal bus 270. The print instruction provided by the user is, for example, selection of a sheet type.

The image processing unit 208 acquires the PDL data stored in the RAM 202, and performs image processing of converting the PDL data into print data. The image processing of converting the PDL data into the print data is, for example, processing in which rasterization is performed on the PDL data to convert the PDL data into multivalued bitmap data, and screen processing or the like is performed to convert the multivalued bitmap data into binary bitmap data. The binary bitmap data acquired by the image processing unit 208 is transmitted to the printer unit 209 via the engine I/F unit 205.

The printer unit 209 prints the received binary bitmap data on a recording sheet by using color materials. The CPU 201 issues an instruction to the printer unit 209 based on the print instruction provided by the user stored in the RAM 202. For example, in a case where the user instructs printing using coated paper, the CPU 201 instructs the printer unit 209 to output a sheet from the sheet feeding deck in which the coated paper is stored, inside the image forming apparatus 100. The CPU 201 controls various types of processing from reception of the above-described PDL data to the printing on the sheet, thus forming a full-color toner image on the sheet.

The inspection unit 110 performs control to transfer image data acquired by an image reading unit 216 to the inspection apparatus 150 described below via the communication cable 170. The inspection unit 110 acquires the inspection result from the inspection apparatus 150, and transmits the inspection result to the image forming apparatus 100 and the finisher 120. The inspection unit 110 includes a control unit 210. The control unit 210 includes a CPU 211, a RAM 212, a ROM 213, a communication I/F unit 214, the accessory I/F unit 215, and the image reading unit 216.

The CPU 211 controls the entire inspection unit 110. The RAM 212 functions as a work area when the CPU 211 performs various instructions. The ROM 213 stores program data to be executed by the CPU 211 at startup, setting data of the control unit 210, and the like. The communication I/F unit 214 communicates with the inspection apparatus 150 via the communication cable 170, and communicates scanned image read by the image reading unit 216 and data, such as an inspection result. The accessory I/F unit 215 is connected to the accessory I/F units 204 and 224 via the cable 280.

The image reading unit 216 reads the printed material conveyed from the image forming apparatus 100. The image reading unit 216 reads the printed material to generate the scanned image. The control unit 210 includes an internal bus (system bus) 271.

The finisher 120 includes a control unit 220. The control unit 220 includes a CPU 221, a RAM 222, a ROM 223, and the accessory I/F unit 224.

The CPU 221 controls the entire finisher 120. The RAM 222 functions as a work area when the CPU 221 performs various instructions. The ROM 223 stores program data to be executed by the CPU 221 at startup, setting data of the control unit 220, and the like. The accessory I/F unit 224 is connected to the accessory I/F units 204 and 215 via the cable 280.

The finisher 120 is an apparatus that performs switching of post-processing (e.g., bookbinding) corresponding to the print setting, and switching of a sheet discharge destination based on the inspection result, for the printed material conveyed from the inspection unit 110. For example, in a case where the sheet discharge destination is switched based on the inspection result indicating the presence or absence of an abnormality in the printed material, a sheet having no abnormality is discharged to a normal output tray, and a sheet having abnormality is discharged to a tray different from the normal output tray. The control unit 220 includes an internal bus (system bus) 272.

The inspection apparatus 150 inspects the scanned image of the printed material acquired by the inspection unit 110. The inspection apparatus 150 includes a control unit 250 and a UI unit 257. The control unit 250 includes a CPU 251, a RAM 252, a ROM 253, a communication I/F unit 254, a network I/F unit 255, and an inspection processing unit 256.

The CPU 251 controls the entire inspection apparatus 150. The RAM 252 functions as a work area when the CPU 251 performs various instructions. The ROM 253 stores program data to be executed by the CPU 251 at startup, setting data of the control unit 250, and the like. The communication I/F unit 254 communicates with the inspection unit 110 via the communication cable 170, and communicates the scanned image read by the image reading unit 216 and data, such as an inspection result. The network I/F unit 255 communicates data with the client PC 130, the image forming apparatus 100, and the information processing apparatus 140 via the network 160. The inspection processing unit 256 inspects whether the printed material has a defect. An internal bus 275 is a system bus. The UI unit 257 enables the user to perform setting of the inspection apparatus 150 and is used to display the inspection result. Here, the setting of the inspection apparatus 150 which is made by the user means setting of, for example, a circular defect (spot) and a linear defect (stripe).

Next, outline of printed image inspection that is performed by the inspection apparatus 150 will be described. The inspection apparatus 150 acquires a scanned image (read sheet) of an inspection target read by the inspection unit 110. The acquired scanned image to be inspected is stored in the RAM 252.

Subsequently, the inspection apparatus 150 causes the inspection processing unit 256 to perform inspection by comparing a reference image previously stored as a reference image in the RAM 252 with the scanned image of the inspection target. More specifically, the inspection processing unit 256 extracts feature points from each of the reference image and the scanned image and aligns the reference image and the scanned image based on the extracted feature points. If a difference between a pixel value (luminance value) of a pixel to be inspected in the aligned scanned image and a pixel value (luminance value) of a pixel to be compared in the reference image is less than or equal to a threshold, the inspection processing unit 256 determines that the pixel to be inspected is acceptable. The threshold is varied for each inspection level. The inspection is performed for each reference image corresponding to each scanned image.

After all of the pixels are inspected, it is determined whether the total sum of pixels determined to be unacceptable is less than or equal to an acceptance threshold and determines whether the scanned image is normal. In a case where the total sum of pixels determined to be unacceptable is less than or equal to the acceptance threshold, the inspection processing unit 256 determines that the scanned image is normal. In a case where the total sum of pixels determined to be unacceptable exceeds the acceptance threshold, the inspection processing unit 256 determines that the scanned image is not normal. A result of the inspection is stored in the RAM 252. Examples of the result of the inspection include information indicating whether the printed material has a defect, a type of the detected defect (spot and stripe), and information about the position of the defect which is displayed on the UI unit 257.

Next, the CPU 251 of the inspection apparatus 150 instructs the UI unit 257 to display the inspection result stored in the RAM 252. With the inspection result displayed on the UI unit 257, the user recognizes the inspection result. In a case where a predetermined number of defective printed materials successively occur, the CPU 251 transmits the above-described information to the inspection unit 110 via the communication I/F unit 254.

The information indicating that the printed materials with a defective successively occur is received by the control unit 210 via the communication I/F unit 214. In response to the control unit 210 receiving the above-described information, the CPU 211 transmits the above-described information to the image forming apparatus 100 via the accessory I/F unit 215. The above-described information is received by the control unit 200 via the accessory I/F unit 204. In response to the control unit 200 receiving the above-described information, the CPU 201 instructs the printer unit 209 to stop printing. The image forming apparatus 100 stops the printing operation by instructing the printer unit 209 to stop printing. Further, the inspection unit 110 causes the CPU 211 to transmit information to the finisher 120 via the accessory I/F unit 215. The information to be transmitted to the finisher 120 is information indicating whether the printed material has a defect. The finisher 120 discharges the printed material having no defect to a normal sheet discharge tray, and discharges the printed material having a defect to a tray different from the normal sheet discharge tray, based on the received information.

<Job Setting>

Figure 3:
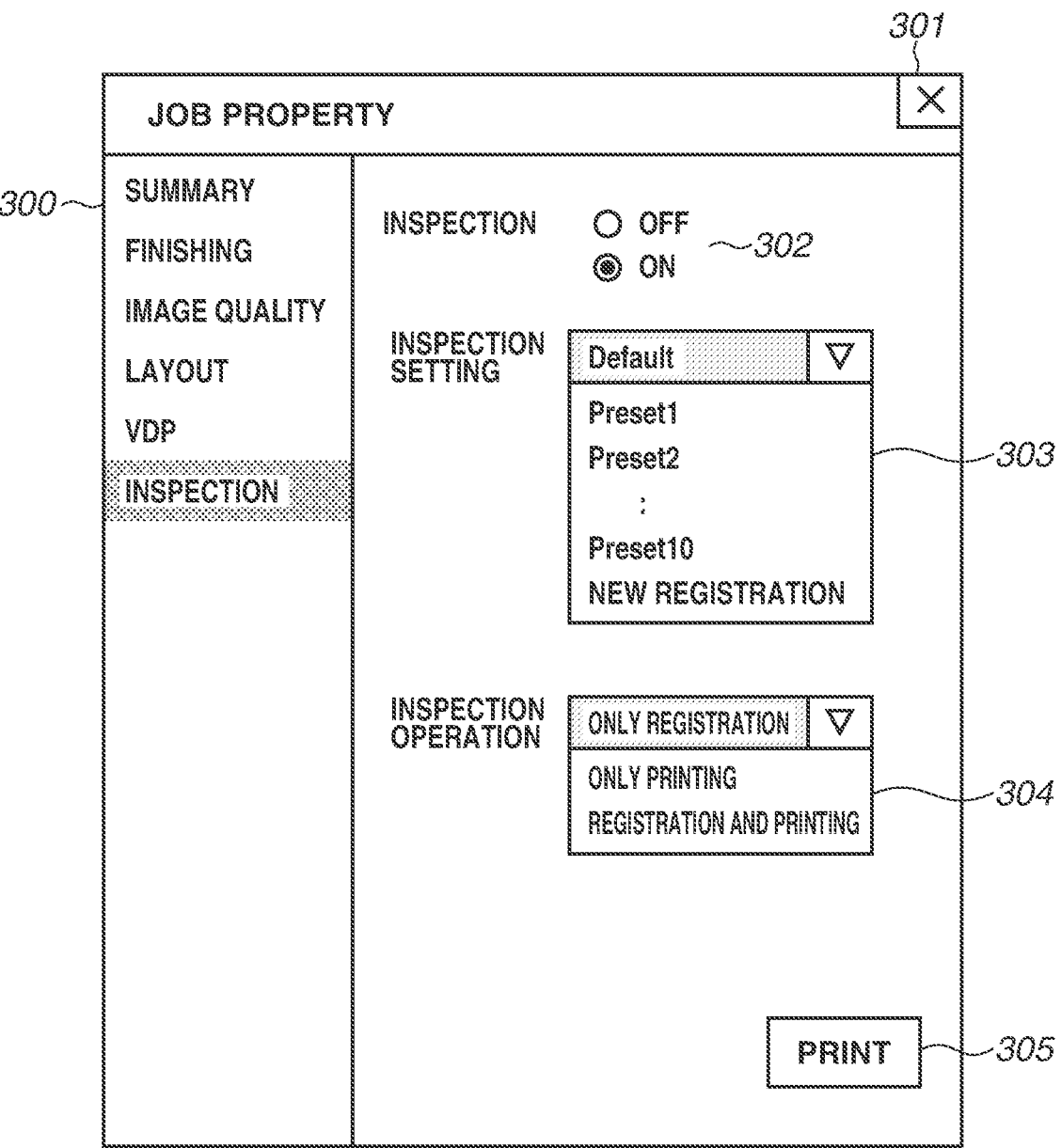
FIG. 3 illustrates an example of a job property screen according to the first embodiment.

Next, inspection method selection for an inspection job according to the present embodiment will be described with reference to FIG. 3. FIG. 3 illustrates an example of a job property screen displayed on the UI unit 235 of the client PC 130.

An inspection method selection screen 300 is used to receive print job setting from the user in the client PC 130. The print job generated by the client PC 130 is transmitted to and managed by the information processing apparatus 140.

In a case where the user selects inspection "ON" in an inspection mode setting section 302, property setting is then performed. The print job in which inspection "ON" has been set is referred to as an "inspection job". In a case where the user selects inspection "OFF", the print job is handled as a normal print job, which is not to be inspected. The user selects a region to be inspected and an inspection level in an inspection setting section 303. In a case where "Default" is selected, the inspection apparatus 150 inspects an entire area of the image at a standard level. In a case where any of "Preset1" to "Preset10" is selected, the inspection apparatus 150 performs inspection based on a previously designated region and a previously designated level. In a case where "new registration" is selected, the user newly creates inspection setting, and the inspection apparatus 150 performs inspection based on the setting.

The user registers the reference image and/or selects a combination of print operation of the regular print job in an inspection operation setting section 304. In a case where "only registration" is selected, the inspection apparatus 150 performs only registration of the reference image and inspection setting thereof. In a case where "only printing" is selected, printing by the image forming apparatus 100 and inspection by the inspection apparatus 150 are performed using the previously registered reference image. In a case where "registration and printing" is selected, the operation in the case where "only registration" is selected and the operation in the case where "only printing" is selected are successively performed. Generation of the reference image and storage processing are described below. Finally, when a print button 305 is pressed, operation of printing and/or inspection is performed based on the setting input in the setting sections 302 to 304. When a close button 301 is pressed, the screen is closed without saving the setting of the screen.

<Job Execution Processing>

Figure 4:
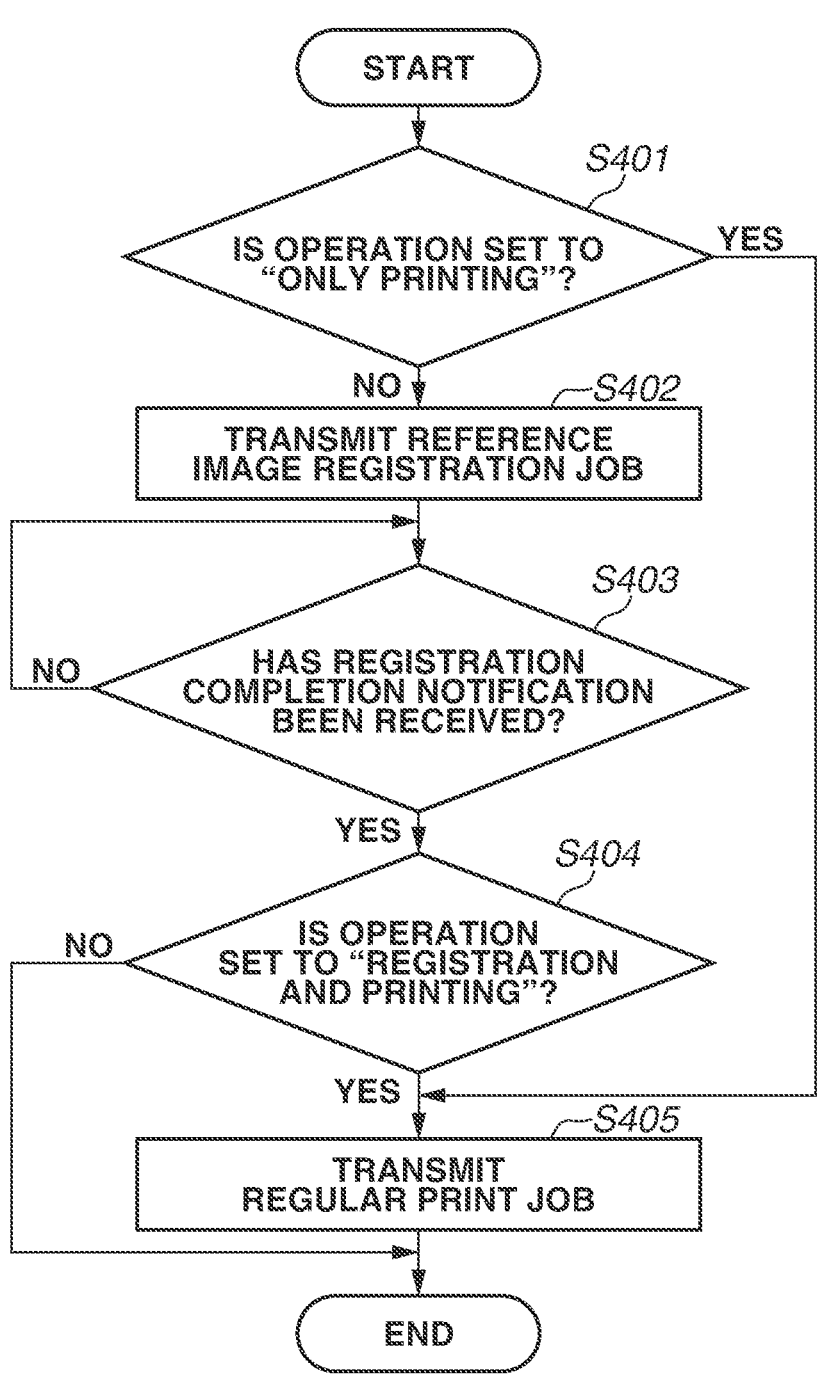
FIG. 4 is an flowchart of inspection which is performed by an information processing apparatus according to the first embodiment.

Next, processing of job execution which is performed by the information processing apparatus 140 is described with reference to a flowchart in FIG. 4. The flowchart is realized by the CPU 241 loading program codes stored in the ROM 243 to the RAM 242 and reading out and executing the program codes loaded to the RAM 242.

In step S401, the CPU 241 determines whether a setting value (operation) set in the inspection operation setting section 304 illustrated in FIG. 3 is "only printing". If "only printing" is set (YES in step S401), the processing proceeds to step S405. If the set operation is other than "only printing" (NO in step S401), the processing proceeds to step S402.

In step S402, the CPU 241 transmits a reference image registration job to the inspection apparatus 150. At this time, the RIP image, various types of print setting information, and the like are transmitted.

In step S403, the CPU 241 determines whether a registration completion notification has been received from the inspection apparatus 150. If the registration completion notification has been received (YES in step S403), the processing proceeds to step S404. If the registration completion notification has not been received (NO in step S403), the CPU 241 waits for the registration completion notification.

In step S404, the CPU 241 determines whether the setting value set in the inspection operation setting section 304 illustrated in FIG. 3 is "registration and printing". If the setting value is "registration and printing" (YES in step S404), the processing proceeds to step S405. If the setting value is "only registration" (NO in step S404), the processing ends.

In step S405, the CPU 241 transmits a regular print job for inspection. At this time, the CPU 241 transmits the RIP image, various types of print setting information, and the like to the image forming apparatus 100, and the processing ends.

<Reference Image Registration Processing>

Next, processing of a registration work which is performed by the inspection apparatus 150 before start of inspection will be described with reference to the flowchart in FIG. 5. The flowchart is realized by the CPU 251 loading program codes stored in the ROM 253 to the RAM 252 and reading out and executing the program codes loaded to the RAM 252.

In the RIP inspection, the RIP image generated by the information processing apparatus 140 is transmitted to the inspection apparatus 150.

In step S501, the CPU 251 receives a start notification of the reference image registration job from the information processing apparatus 140.

Figures 6A, 6B:
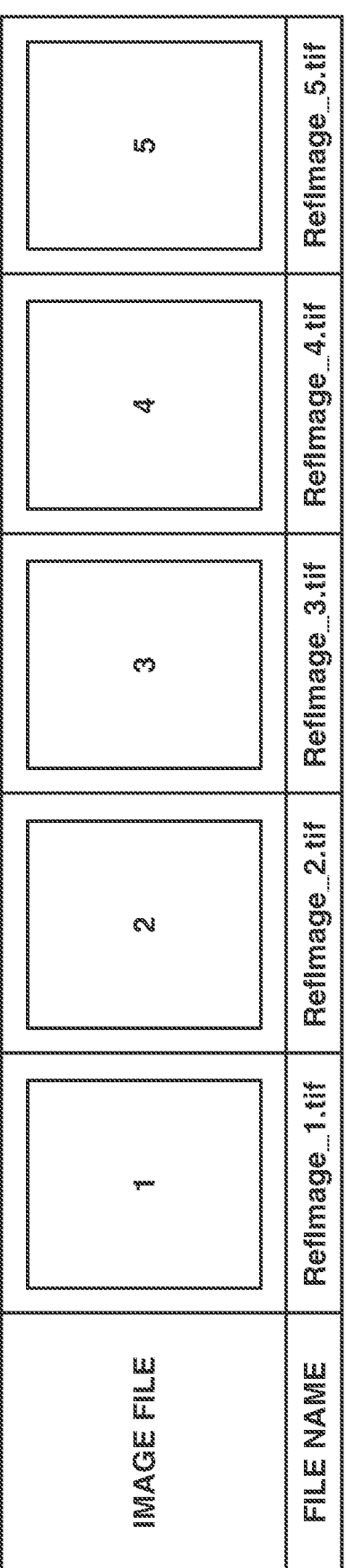
FIGS. 6A and 6B illustrate examples of a raster image processor (RIP) image and a sheet information list according to the first embodiment.

In step S502, the CPU 251 receives the RIP image and the print setting information from the information processing apparatus 140. In this example, a five-page RIP image illustrated in FIG. 6A is received. In this example, an identification (ID) enabling determination of a page order is assigned to each image file name. In the present embodiment, for example, "*" portion in the file name "RefImage_*.tif" is identified as a page ID. The page ID is represented by, for example, a number or a character string. A method of imparting the page ID is not limited thereto, and information such as an ID list may be separately received from the information processing apparatus 140. The print setting information is setting information for single-sided printing, double-sided printing, or the like. In the present embodiment, setting of single-sided/double-sided printing will be described; however, for example, setting information for face-up/face-down discharging or forward order/reverse order printing may be received. In this example, the print setting information is acquired from the information processing apparatus 140. Alternatively, print setting may be performed from the UI unit 257 of the inspection apparatus 150 to acquire the setting value.

In step S503, the CPU 251 stores the image received in step S502 in a storage device, such as the RAM 252. The CPU 251 generates a sheet information list and stores the sheet information list in the RAM 252. FIG. 6B illustrates the sheet information list in a case where image data for five pages in FIG. 6A is registered as a reference image with double-sided setting. In a case where image data for an odd number of pages is registered as the reference image with double-sided setting as in FIG. 6B, a final page is a blank page having no corresponding reference image. In the present embodiment, the sheet information list is generated by the inspection apparatus 150 but may be generated by the information processing apparatus 140 and may be transmitted to the inspection apparatus 150. The sheet information list is a list including elements indicating correspondence of the page IDs to a print sheet and a print side thereof. An element 601 indicates a front side of a first sheet. A first page is printed on the front side of the first sheet. In this case, the page ID corresponding to the element is one. An element 602 is indicates a back side of the first sheet. Since the job is set to double-sided printing, a second page is printed on this side. Thus, the page ID corresponding to the element 602 is two.

A similar configuration is applied to elements 603 to 605. An element 606 indicates a back side of a third sheet. Since the print job includes five pages, the print data for the back side of the third sheet is absent, and the image data is not transmitted from the information processing apparatus 140.

Thus, the inspection apparatus 150 stores a page ID corresponding to the element 606 as "blank" in the sheet information list. The page ID "blank" is illustrative, and the page ID is not limited thereto as long as the page ID indicates the blank page. In a case where a notification is issued from the information processing apparatus 140, any notification methods may be used with which a notification to the inspection apparatus 150 that the print data is absent and the image data is not transmitted from the information processing apparatus 140 is enabled.

In step S504, the CPU 251 determines whether all of the pages have been completely received. If all of the images have been completely received (YES in step S504), the processing proceeds to step S505. If a subsequent page is present (NO in step S504), the processing returns to step S502, and an image of the next page is received.

In step S505, the CPU 251 refers to the sheet information list stored in step S503 and determines whether a page having the page ID "blank" is present. If a page having the page ID "blank" is present (YES in step S505), the processing proceeds to step S506. If a page having the page ID "blank" is absent (NO in step S505), the processing proceeds to step S507. In step S506, the CPU 251 generates a blank reference image data corresponding to the page having the page ID "blank" and stores the blank reference image data in the RAM 252. Generating the reference image data for the page for which the print data is absent and the RIP image is not to be generated makes it possible to perform inspection on the blank page (blank surface) for which the reference image is not to be generated. In this example, the reference image corresponding to the blank page is generated; however, the configuration is not limited thereto. For example, the reference image data previously registered may be cited and stored in the RAM 252. The reference image corresponding to the page ID "blank" may not be stored in the RAM 252, and the reference data to be used for the subsequent inspection may be designated in step S506.

In step S507, the CPU 251 transmits the registration completion notification to the information processing apparatus 140.

<Inspection Processing>

Figure 7:
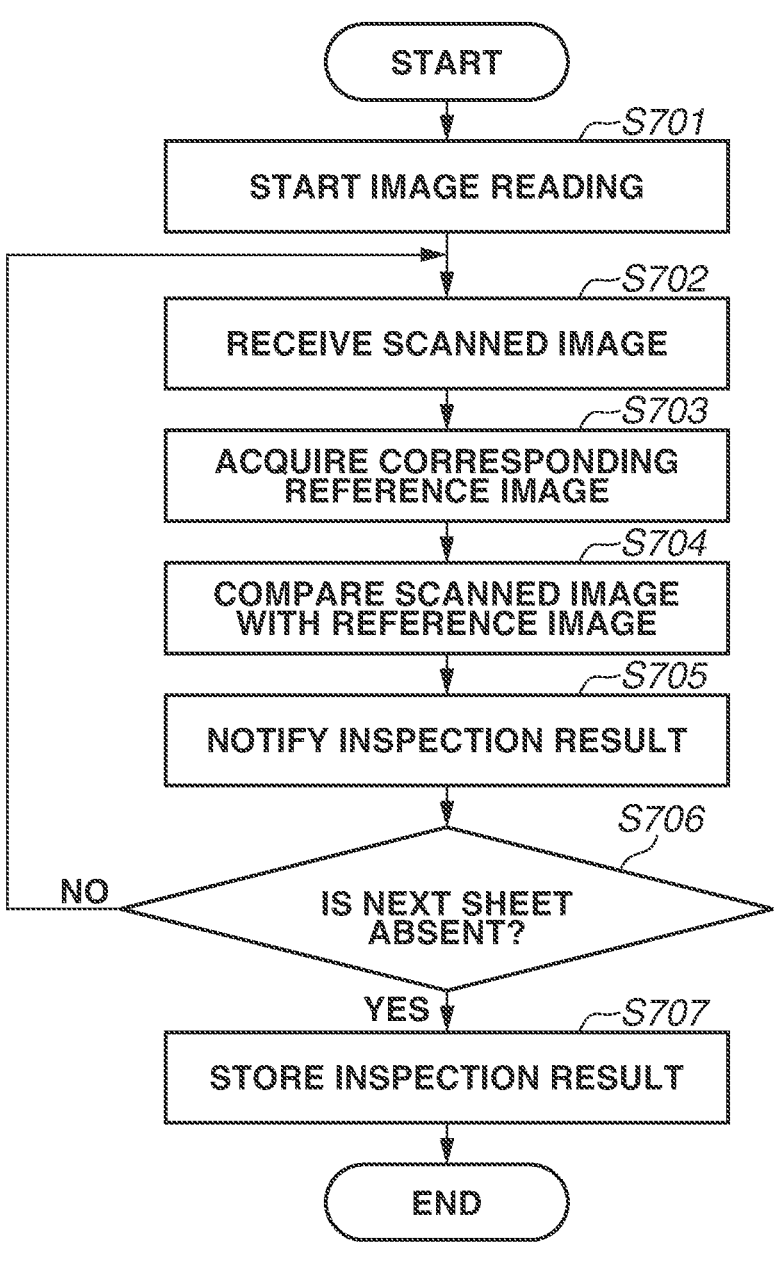
FIG. 7 is a flowchart of inspection which is performed by the inspection apparatus according to the first embodiment.

Next, processing of inspection which is performed by the inspection apparatus 150 will be described with reference to the flowchart in FIG. 7.

The flowchart is realized by the CPU 251 loading the program codes stored in the ROM 253 to the RAM 252 and reading out and executing the program codes loaded to the RAM 252.

In step S701, the CPU 251 receives start of the regular print job from the information processing apparatus 140 and starts reading of an inspection image.

In step S702, the CPU 251 receives a scanned image. The scanned image is generated by the inspection unit 110 reading the printed material.

Figure 5:
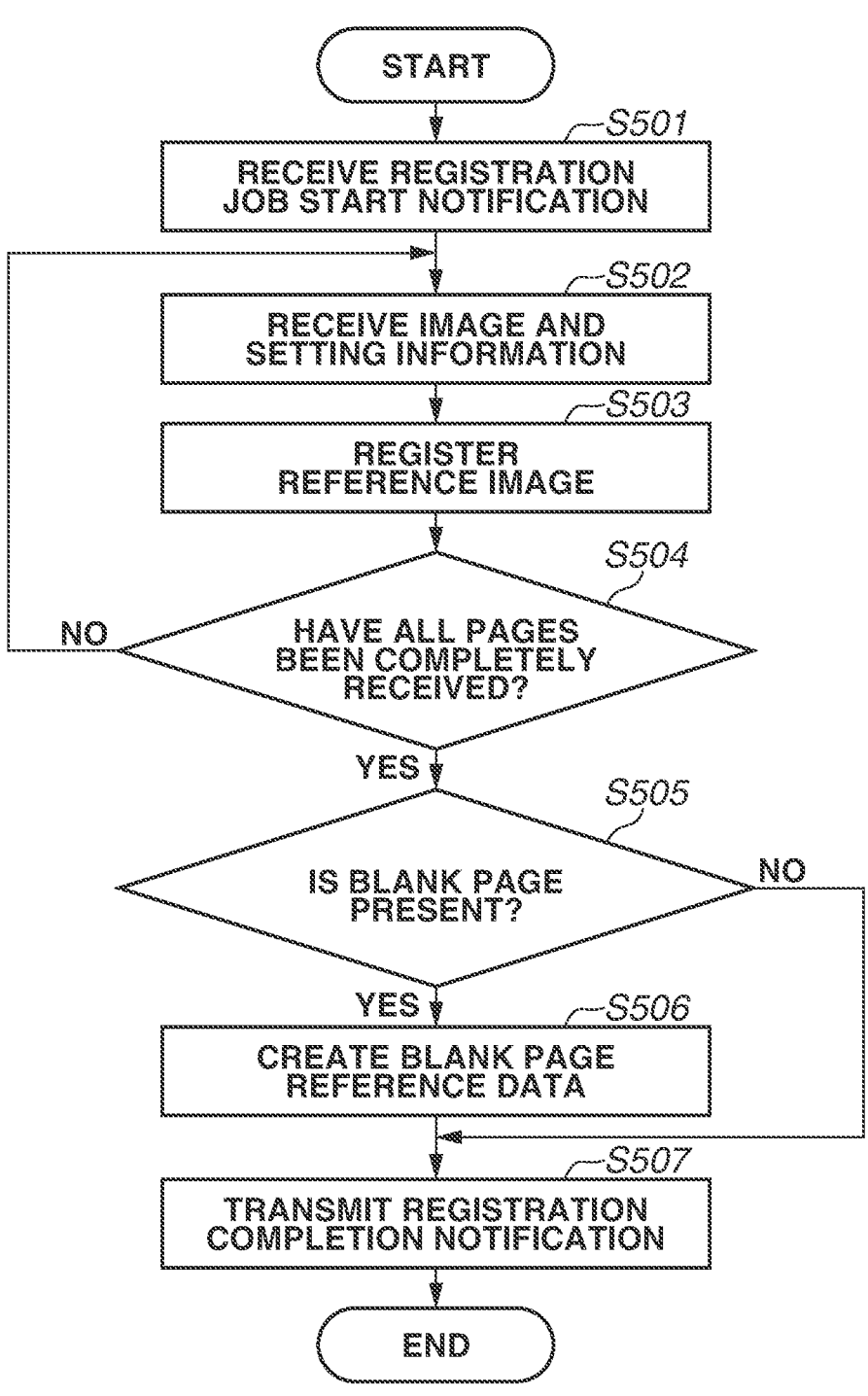
FIG. 5 is a flowchart of reference image registration which is performed by the inspection apparatus according to the first embodiment.

In step S703, the CPU 251 acquires the reference image registered in the reference image registration processing illustrated in FIG. 5. Here, the inspection apparatus 150 determines the page ID from a sheet number to be printed and the information indicating a print side, and acquires the reference image corresponding to the page ID. For example, in a case where the image read in step S702 is an image on the front side of the first sheet, the inspection apparatus 150 refers to the sheet information list and detects that the corresponding page ID is one. The inspection apparatus 150 detects that the reference image corresponding to the page ID of one is "RefImage_1.tif". In a case where the page ID is blank, the inspection apparatus 150 acquires the blank image data generated in step S507.

In step S704, the CPU 251 performs inspection by comparing the scanned image acquired in step S702 with the reference image acquired in step S703. In the present embodiment, in the case where the reference image is not generated, the blank image file is generated and the inspection is performed. Accordingly, as in the case where the reference image is generated, the two images can be compared to detect an image defect, and the processing is advantageously performed in a similar manner to when a reference image is generated; however, the processing is not limited thereto. For example, the inspection may be performed using a previously recorded blank image file. Reference data indicating white and all pixels of the scanned image may be compared. More specifically, pixel data indicating white and the pixels of the scanned image are compared. This method excludes the need to generate the blank image data. The scanned image itself may be regarded as an image difference and an image defect may be detected.

In step S705, the CPU 251 notifies the inspection unit 110 of an inspection result.

The inspection result is also notified to the image forming apparatus 100. The notified inspection result is used, for example, as described below. In a case where the notified inspection result indicates a failure, printing is stopped. The inspection result is also notified to the finisher 120, and a sheet having the inspection result indicating a failure is discharged to a tray different from the normal sheet discharge tray. The inspection result is displayed on the UI unit 257 of the inspection apparatus 150.

Figure 8:
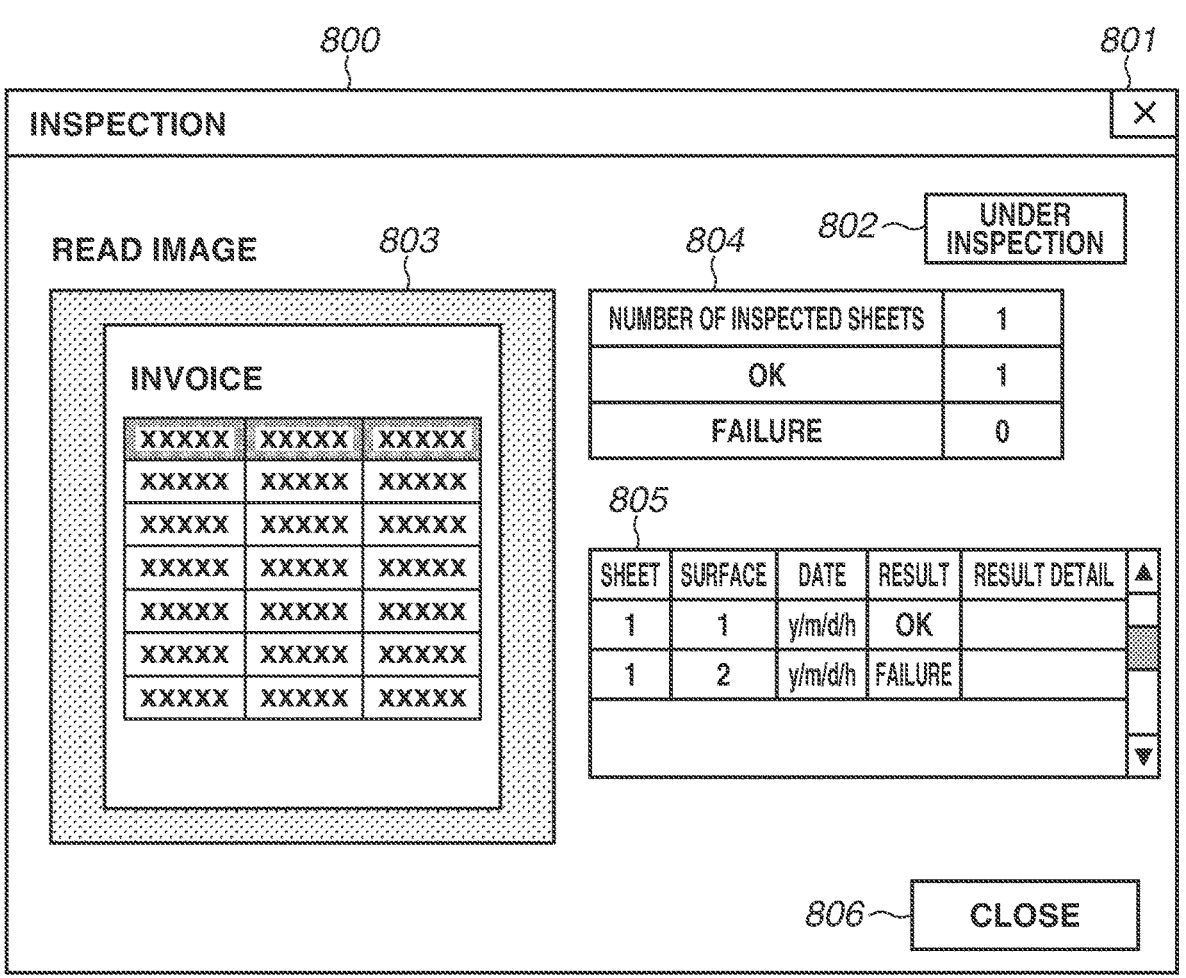
FIG. 8 illustrates an example of a user interface (UI) screen in the inspection according to the first embodiment.

FIG. 8 illustrates an example of a screen displayed on UI unit 257 of the inspection apparatus 150 during the inspection.

A button 801 is used to hide a screen 800. When button 801 is pressed, the screen 800 is closed. In a region 802, an inspection status is displayed. In a region 803, the image of the read printed sheet is displayed. In a region 804, the inspection result is displayed.

In a region 805, the inspection result for each side of the inspection sheet is displayed. In a case where the inspection result indicates a failure, a detailed result of a factor causing the failure is also displayed. As a display of the detailed result, the inspection sheet displayed in the region 805 may be selected, and the image of the selected inspection sheet may be displayed in the region 803. In the present embodiment, the number of inspection sheets, the number of sheets determined to be OK, and the number of sheets determined to be a failure are displayed; however, the display is not limited thereto as long as items enabling the user to easily understand the inspection result are displayed. A button 806 is used to store the inspection result and to end the inspection. When the button 806 is pressed, the screen 800 is closed.

In step S706, the CPU 251 determines whether all of the sheets have been completely read. If not all of the sheets have been read (NO in step S706), the processing returns to step S702, and a next sheet is read. If all of the sheets have been completely read (YES in step S706), the processing proceeds to step S707.

In step S707, the CPU 251 stores the inspection result in the RAM 252, and the processing ends.

The foregoing is the description of the inspection execution processing. As described above, it is possible to provide the inspection system that can perform inspection for a page for which the RIP image is not to be generated even in a case where a page for which the print data is absent and the RIP image is not to be generated, according to the present embodiment.

A second embodiment of the present invention will be described below. In the first embodiment, the method in which the inspection is performable by generating the blank image even in the case where the print data is absent and the RIP image is not to be generated, has been described. However, for example, in the case of single-sided printing, the inspection on stain and the like on the back side of the printed material may be unnecessary. In a case where necessity of the inspection on the blank surface is changed depending on an artifact, it is necessary to set or delete the inspection region for each inspection page so as to match with the artifact. In the second embodiment, a description will be provided of a method of switching between enabling and disabling of the inspection on the page for which the print data is absent and the RIP image is not to be generated, with a simple operation. In the following, parts of the present embodiment different from the above-described first embodiment are described. Parts not described in detail are similar to those in the first embodiment.

A screen for selecting an inspection method for the inspection job according to the present embodiment will be described with reference to FIG. 9.

Figure 9:
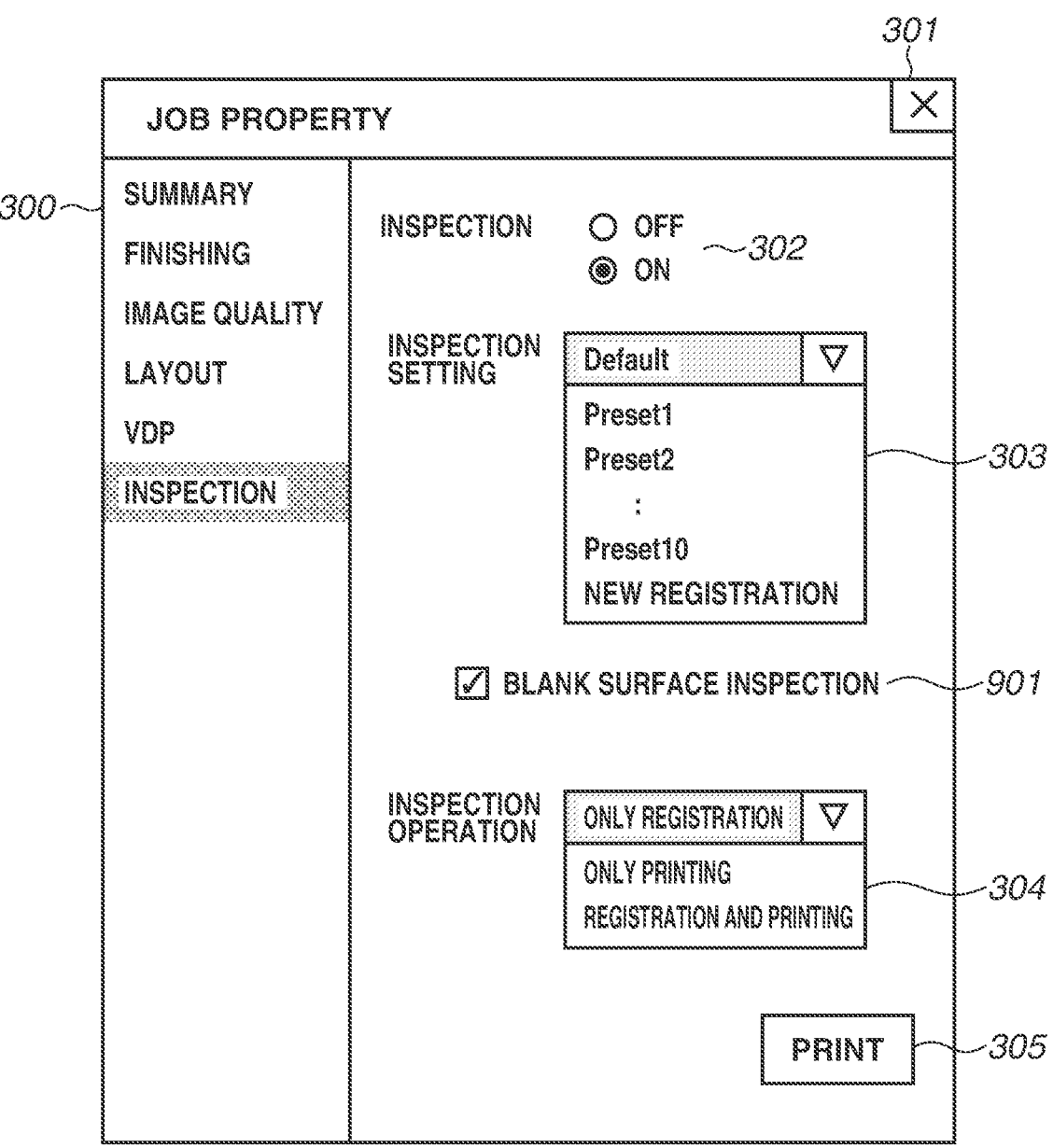
FIG. 9 illustrates an example of a job property screen according to a second embodiment.

FIG. 9 illustrates an example of a job property screen that is displayed on the UI unit 235 of the client PC 130. The elements 301 to 305 are similar to those in the first embodiment. Thus, descriptions of the elements 301 to 305 are omitted.

A setting item 901 is used to set whether the blank surface is to be subjected to the inspection. In a case where a checkbox is checked, the blank surface for which the print data is absent is to be inspected. In a case where the checkbox is unchecked, the inspection on the blank surface for which the print data is absent is skipped. In the present embodiment, the setting is performed on the UI of the client PC 130; however, this is not restrictive. For example, the setting may be performed on the UI unit 257 of the inspection apparatus 150 and/or the UI unit 246 of the information processing apparatus 140 without limitation as long as the setting value can be transmitted to the inspection apparatus 150. The setting value is transmitted to and managed by the information processing apparatus 140. The setting value of the setting item 901 is transmitted to the inspection apparatus 150 when the reference image registration job is transmitted in step S402 illustrated in FIG. 4.

Figure 10:
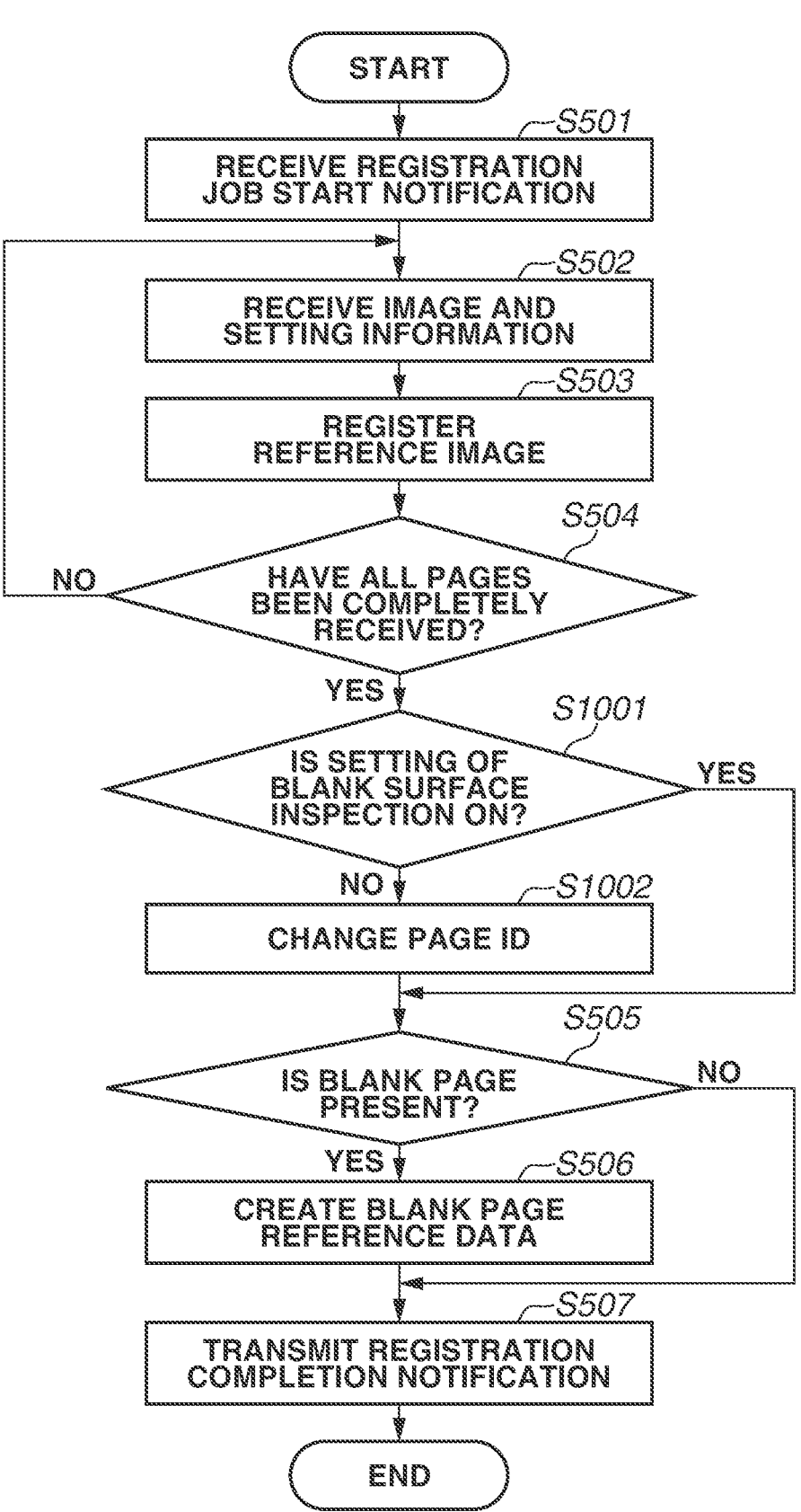
FIG. 10 is a flowchart of reference image registration which is performed by an inspection apparatus according to the second embodiment.

Next, processing of a registration work which is performed by the inspection apparatus 150 before a start of inspection according to the present embodiment will be described with reference to the flowchart in FIG. 10. The flowchart is realized by the CPU 251 loading the program codes stored in the ROM 253 to the RAM 252 and reading out and executing the program codes loaded to the RAM 252.

The operations in steps S501 to S507 are similar to those in the first embodiment. Thus, descriptions of the operations are omitted.

In step S1001, the CPU 251 acquires the setting value of the setting item 901 illustrated in FIG. 9 and determines whether the setting of blank surface inspection is ON. If the setting of blank surface inspection is ON (YES in step S1001), the processing proceeds to step S505. If the setting of blank surface inspection is OFF (NO in step S1001), the processing proceeds to step S1002.

In step S1002, the CPU 251 changes the page ID of the blank surface. FIGS. 11A and 11B illustrate a change example of the page ID. FIG. 11A illustrates the sheet information list generated in step S503 in a case where single-sided printing of the five-page image data illustrated in FIG. 6A is performed. FIG. 11B illustrates an example in which, in the case where the setting of the blank surface inspection is OFF in step S1001, the page ID set to "blank" is changed to "skip". When the page ID is changed to "skip", the control is performed so as to skip the inspection described below.

Figure 12:
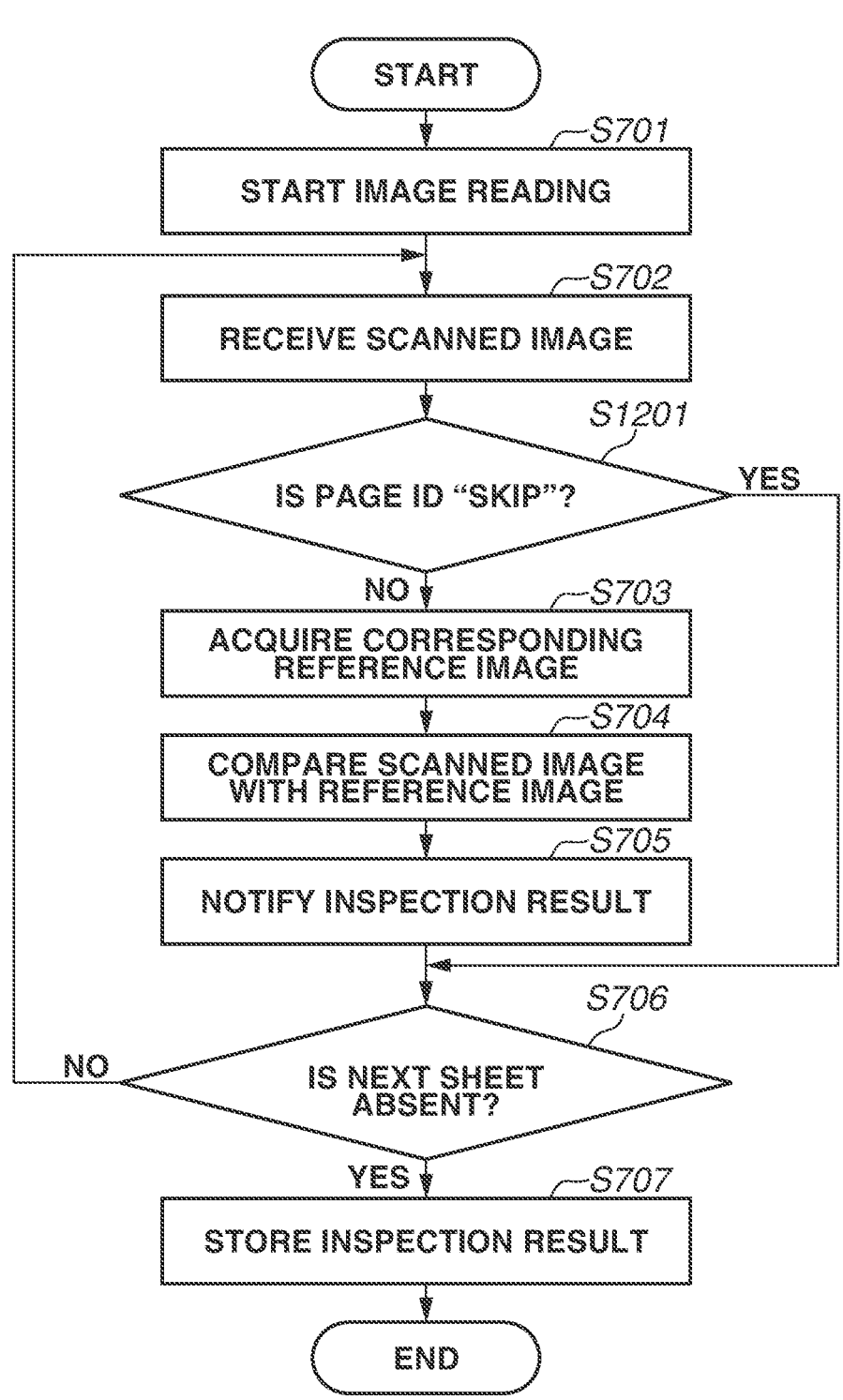
FIG. 12 is a flowchart of inspection which is performed by the inspection apparatus according to the second embodiment.

Next, processing of inspection which is performed by the inspection apparatus 150 according to the present embodiment will be described with reference to the flowchart in FIG. 12. This flowchart is realized by the CPU 251 loading the program codes stored in the ROM 253 to the RAM 252 and reading out and executing the program codes loaded to the RAM 252. The operations in steps S701 to S707 are similar to those in the first embodiment. Thus, descriptions of the operations are omitted.

In step S1201, the CPU 251 refers to the sheet information list, and acquires the page ID. At this time, the CPU 251 determines the page ID from a sheet number to be printed and the information about the print side. If the page ID is "skip" (YES in step S1201), the processing proceeds to step S706. If the page ID is other than "skip" (NO in step S1201), the processing proceeds to step S703. As described above, if the page ID is set to "skip", the operations in steps S703 to S705 are skipped, and the control is performed so as not to perform the inspection.

In the present embodiment, the control is performed so as not to perform the inspection; however, an inspection result may be regarded as "OK" and notified.

As described above, according to the present embodiment, enabling and disabling of the inspection on the print side for which the print data is absent and the RIP image is not generated is switched with a simple operation. This makes it possible to perform inspection on the print side for which the RIP image is not generated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-082097, filed May 19, 2022, which is hereby incorporated by reference herein in its entirety.

What is claimed is:

1. An inspection apparatus configured to be communicably connected to an image forming apparatus for printing an image on a sheet, the inspection apparatus comprising a controller for:

receiving at least a reference image and print setting information;

registering the reference image based on the print setting information;

receiving a scanned image generated by reading a printed material on which an image is printed on the sheet; and inspecting the printed material based on the scanned image and the reference image corresponding to the scanned image, wherein the controller is arranged to perform the inspection using reference data when the scanned image comprises a blank page for which a corresponding reference image is not registered, wherein the controller is arranged to generate a reference image corresponding to the blank page, and wherein the reference data comprises the reference image corresponding to the blank page generated by the controller.

2. The inspection apparatus according to claim 1, wherein the reference data is the reference image corresponding to the blank page.

3. The inspection apparatus according to claim 1, wherein the controller registers the reference image in association with each page of the printed material based on the print setting information and registers an instruction to use the reference data in the inspection, for a page of the printed material with no corresponding reference image.

4. The inspection apparatus according to claim 1, wherein the controller registers the reference image in association with each page of the printed material based on the print setting information, and registers as the reference image the reference data for a page of the printed material with no corresponding reference image.

5. The inspection apparatus according to claim 1, wherein the reference data is pixel data indicating white.

6. The inspection apparatus according to claim 1, wherein the controller is arranged to perform control to inspect the printed material including the blank page, based on an instruction to inspect the blank page, and wherein the controller is arranged to perform control to skip the inspection of the blank page based on an instruction not to inspect the blank page.

7. The inspection apparatus according to claim 1, wherein the inspection apparatus is communicably connected to an image processing apparatus, and wherein the reference image is a raster image received from the image processing apparatus.

8. The inspection apparatus according to claim 1, wherein the received reference image corresponds to the image to be printed by the image forming apparatus.

9. The inspection apparatus according to claim 1, wherein the print setting information is setting information relating to single-sided printing or double-sided printing.

10. The inspection apparatus according to claim 1, wherein the blank page is a page on which an image of a printed material obtained by the image forming apparatus printing images for pages with odd numbers in double-sided printing is not printed.

11. The inspection apparatus according to claim 1, wherein the blank page is a surface on which an image of a printed material having been subjected to single-sided printing in the image forming apparatus is not printed.

12. The inspection apparatus according to claim 1, wherein the controller receives the scanned image generated by reading, by a reader, the image on the printed material conveyed from a conveyor configured to receive the printed matter from a printer by which the printed matter has been generated and configured to convey the printed matter.

13. The inspection apparatus according to claim 1, wherein, before receiving the scanned image, the controller receives the reference image and the print setting information, and, based upon information on the blank page being included in the print setting information, generates the reference data.

14. A method for controlling an inspection apparatus configured to be communicably connected to at least an image forming apparatus configured to print an image on a sheet, the method comprising:

receiving at least a reference image and print setting information;

registering the reference image based on the print setting information;

receiving a scanned image generated by reading a printed material on which an image is printed on the sheet; and inspecting the printed material based on the scanned image and the reference image corresponding to the scanned image, wherein inspection is performed, using reference data, when the scanned image comprises a blank page for which a corresponding reference image is not registered, wherein the inspection apparatus generates a reference image corresponding to the blank page, and wherein the reference data comprises the reference image corresponding to the blank page generated by the inspection apparatus.

\* \* \* \* \*